United States Patent
Chavarria et al.

(10) Patent No.: US 9,530,151 B2
(45) Date of Patent: Dec. 27, 2016

(54) METHOD AND SYSTEM FOR RECOMMENDING A MERCHANT BASED ON TRANSACTION DATA

(71) Applicant: MasterCard International Incorporated, Purchase, NY (US)

(72) Inventors: Pedro Chavarria, Hampton Bays, NY (US); Kristofer Perez, New York, NY (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 14/554,981

(22) Filed: Nov. 26, 2014

(65) Prior Publication Data

US 2016/0148258 A1    May 26, 2016

(51) Int. Cl.
*G06K 5/00* (2006.01)
*G06F 17/00* (2006.01)
*G06F 7/00* (2006.01)
*G06K 15/00* (2006.01)
*G06Q 30/02* (2012.01)

(52) U.S. Cl.
CPC ...... *G06Q 30/0255* (2013.01); *G06Q 30/0261* (2013.01)

(58) Field of Classification Search
USPC ....... 235/375, 380, 383, 449, 493, 376, 385; 705/14–26
See application file for complete search history.

(56) References Cited

U.S. PATENT DOCUMENTS 5,025,138 A    6/1991    Cuervo
6,327,574 B1   12/2001   Kramer et al.
6,801,909 B2   10/2004   Delgado et al.
6,842,737 B1    1/2005   Stiles et al.
7,269,568 B2    9/2007   Stiles et al.
7,792,697 B2    9/2010   Bhagchandani et al.
7,848,950 B2   12/2010   Herman et al.
7,925,540 B1    4/2011   Orttung et al.

(Continued)

FOREIGN PATENT DOCUMENTS

KR    20100044394 A    4/2010
KR    20120076477 A    7/2012

OTHER PUBLICATIONS

PCT International Search Report and Written Opinion for related matter PCT/US2013/077843 dated Apr. 21, 2014; 12 pp.

*Primary Examiner* — Tuyen K Vo
(74) *Attorney, Agent, or Firm* — Armstrong Teasdale LLP

(57) ABSTRACT

A computer-implemented method for recommending a merchant based on transaction data is provided. The method is implemented using an analyzer computing device in communication with one or more memory devices. The method includes generating a profile indicating a stage of life of a cardholder, based at least in part on first transaction data stored in the one or more memory devices. The first transaction data is associated with one or more purchases made by the cardholder through a payment network. The method additionally includes retrieving, from the one or more memory devices, second transaction data associated with a plurality of sales from a first merchant, determining a transaction volume associated with the first merchant, and generating a recommendation for the cardholder to purchase goods from the first merchant, based at least in part on the determined transaction volume and the profile.

20 Claims, 12 Drawing Sheets

(56) References Cited

U.S. PATENT DOCUMENTS

| | | |
|---|---|---|
| 7,958,066 B2 | 6/2011 | Pinckney et al. |
| 7,966,282 B2 | 6/2011 | Pinckney et al. |
| 8,005,832 B2 | 8/2011 | Andrieu |
| 8,032,480 B2 | 10/2011 | Pinckney et al. |
| 8,032,481 B2 | 10/2011 | Pinckney et al. |
| 8,180,702 B2 | 5/2012 | Debow |
| 8,185,487 B2 | 5/2012 | Tuzhilin et al. |
| 8,190,478 B2 | 5/2012 | Herman et al. |
| 8,204,784 B2 | 6/2012 | Bhagchandani et al. |
| 8,255,263 B2 | 8/2012 | Smallwood |
| 8,364,559 B1* | 1/2013 | Bhosle et al. ............. 705/26.63 |
| 8,374,936 B2 | 2/2013 | Fuentes-Torres |
| 8,458,016 B1 | 6/2013 | Medina, III et al. |
| 8,484,142 B2 | 7/2013 | Pinckney et al. |
| 8,489,497 B1 | 7/2013 | Novak et al. |
| 8,494,978 B2 | 7/2013 | Pinckney et al. |
| 8,572,020 B2 | 10/2013 | Tuzhilin et al. |
| 8,583,511 B2 | 11/2013 | Hendrickson |
| 8,666,909 B2 | 3/2014 | Pinckney et al. |
| 8,694,456 B2 | 4/2014 | Grigg et al. |
| 8,719,085 B2 | 5/2014 | Sullivan |
| 2002/0091535 A1 | 7/2002 | Kendall et al. |
| 2002/0147619 A1 | 10/2002 | Floss et al. |
| 2002/0166060 A1 | 11/2002 | Hsieh et al. |
| 2003/0009368 A1 | 1/2003 | Kitts |
| 2006/0043164 A1* | 3/2006 | Dowling et al. ............. 235/375 |
| 2007/0100773 A1 | 5/2007 | Wallach |
| 2007/0143172 A1 | 6/2007 | Bhagchandani et al. |
| 2007/0244741 A1 | 10/2007 | Blume et al. |
| 2008/0167887 A1 | 7/2008 | Marcken |
| 2008/0201271 A1* | 8/2008 | Davis .................... G06Q 10/04 705/400 |
| 2008/0243531 A1* | 10/2008 | Hyder .................... G06Q 30/02 705/1.1 |
| 2008/0249987 A1 | 10/2008 | Ogasawara |
| 2009/0048884 A1 | 2/2009 | Olives et al. |
| 2009/0182568 A1 | 7/2009 | Cordeiro |
| 2009/0192875 A1* | 7/2009 | Bene ...................... G06Q 20/10 705/39 |
| 2009/0192876 A1* | 7/2009 | De ......................... G06Q 30/02 705/7.33 |
| 2009/0198557 A1 | 8/2009 | Wang et al. |
| 2009/0271246 A1 | 10/2009 | Alvarez et al. |
| 2009/0281875 A1 | 11/2009 | Tarka |
| 2009/0319423 A1 | 12/2009 | Kersenbrock |
| 2010/0280880 A1 | 11/2010 | Faith et al. |
| 2011/0022606 A1 | 1/2011 | Mason |
| 2011/0035279 A1 | 2/2011 | Herman et al. |
| 2011/0077951 A1 | 3/2011 | Tullis |
| 2011/0078021 A1 | 3/2011 | Tullis |
| 2011/0307478 A1 | 12/2011 | Pinckney et al. |
| 2012/0109749 A1 | 5/2012 | Subramanian et al. |
| 2012/0123674 A1* | 5/2012 | Perks et al. .................... 701/426 |
| 2012/0226551 A1 | 9/2012 | Bhagchandani et al. |
| 2012/0232968 A1* | 9/2012 | Calman et al. .............. 705/14.4 |
| 2012/0245991 A1 | 9/2012 | Herman et al. |
| 2012/0296724 A1 | 11/2012 | Faro et al. |
| 2012/0303569 A1 | 11/2012 | Tuzhilin et al. |
| 2012/0303676 A1 | 11/2012 | Tuzhilin et al. |
| 2012/0324059 A1 | 12/2012 | Tuzhilin et al. |
| 2013/0024313 A1 | 1/2013 | Dayal et al. |
| 2013/0030925 A1 | 1/2013 | Calman et al. |
| 2013/0046626 A1 | 2/2013 | Grigg et al. |
| 2013/0075469 A1 | 3/2013 | Stochita |
| 2013/0124263 A1* | 5/2013 | Amaro ................... G06Q 30/02 705/7.34 |
| 2013/0124449 A1 | 5/2013 | Pinckney et al. |
| 2013/0179246 A1 | 7/2013 | Ross |
| 2013/0246125 A1 | 9/2013 | Digioacchino et al. |
| 2013/0246176 A1* | 9/2013 | Chang et al. .............. 705/14.53 |
| 2013/0264385 A1 | 10/2013 | Stoudt et al. |
| 2013/0275181 A1 | 10/2013 | Digioacchino et al. |
| 2013/0275417 A1 | 10/2013 | Fernandes |
| 2013/0304691 A1 | 11/2013 | Pinckney et al. |
| 2014/0067596 A1* | 3/2014 | McGovern et al. ......... 705/26.7 |
| 2014/0108320 A1 | 4/2014 | Baca et al. |
| 2014/0129372 A1 | 5/2014 | Kalnsay |
| 2014/0180979 A1 | 6/2014 | Pinckney et al. |
| 2014/0372338 A1* | 12/2014 | Kim .................... G06Q 30/0282 705/347 |
| 2015/0032602 A1* | 1/2015 | Blackhurst ......... G06Q 30/0631 705/39 |
| 2015/0066632 A1* | 3/2015 | Gonzalez ........... G06Q 30/0255 705/14.45 |
| 2015/0066691 A1* | 3/2015 | Ready et al. ............... 705/26.8 |

* cited by examiner

METHOD AND SYSTEM FOR RECOMMENDING A MERCHANT BASED ON TRANSACTION DATA

BACKGROUND

This description relates to processing payment transactions, and more specifically to generating a recommendation for a cardholder to use a particular merchant based on stored transaction data.

Known systems for recommending a merchant to a potential customer require that one or more people affirmatively provide a ranking or opinion of the merchant. Additionally, many such systems require the potential customer to affirmatively indicate the potential customer's interests, such as products and/or services ("goods") that the potential customer would like to purchase. Accordingly, known systems are unable to provide a recommendation of a merchant to a potential customer without significant human effort to determine what the potential customer may be interested in purchasing and which merchant from a set of merchants is the most highly regarded and worthy of recommendation to the potential customer.

BRIEF DESCRIPTION OF THE DISCLOSURE

In one aspect, a computer-implemented method for recommending a merchant based on transaction data is provided. The method is implemented using an analyzer computing device in communication with one or more memory devices. The method includes generating a profile associated with a cardholder, based at least in part on first transaction data stored in the one or more memory devices. The first transaction data is associated with one or more purchases made by the cardholder through a payment network and the profile indicates a stage of life of the cardholder. The method additionally includes retrieving, from the one or more memory devices, second transaction data associated with a plurality of sales associated with a first merchant, wherein the transactions were processed through the payment network. The method additionally includes determining a transaction volume associated with the first merchant and generating a recommendation for the cardholder to purchase goods from the first merchant, based at least in part on the determined transaction volume and the profile associated with the cardholder.

In another aspect, an analyzer computing device for recommending a merchant based on transaction data is provided. The analyzer computing device includes one or more processors in communication with one or more memory devices. The analyzer computing device is configured to generate a profile associated with a cardholder, based at least in part on first transaction data stored in the one or more memory devices. The first transaction data is associated with one or more purchases made by the cardholder through a payment network and the profile indicates a stage of life of the cardholder. The analyzer computing device is additionally configured to retrieve, from the one or more memory devices, second transaction data associated with a plurality of sales associated with a first merchant, wherein the transactions were processed through the payment network. Additionally, the analyzer computing device is configured to determine a transaction volume associated with the first merchant and generate a recommendation for the cardholder to purchase goods from the first merchant, based at least in part on the determined transaction volume and the profile associated with the cardholder.

In yet another aspect, a computer-readable storage medium having computer-executable instructions embodied thereon is provided. When executed by an analyzer computing device having one or more processors in communication with one or more memory devices, the computer-executable instructions cause the analyzer computing device to generate a profile associated with a cardholder, based at least in part on first transaction data stored in the one or more memory devices. The first transaction data is associated with one or more purchases made by the cardholder through a payment network and the profile indicates a stage of life of the cardholder. The computer-executable instructions additionally cause the analyzer computing device to retrieve, from the one or more memory devices, second transaction data associated with a plurality of sales associated with a first merchant, wherein the transactions were processed through the payment network. Additionally, the computer-executable instructions cause the analyzer computing device to determine a transaction volume associated with the first merchant and generate a recommendation for the cardholder to purchase goods from the first merchant, based at least in part on the determined transaction volume and the profile associated with the cardholder.

BRIEF DESCRIPTION OF THE DRAWINGS

FIG. 1 is a schematic diagram illustrating an example multi-party payment card industry system for enabling ordinary payment-by-card transactions in which merchants and card issuers do not necessarily have a one-to-one relationship.

FIG. 2 is a simplified block diagram of a payment processing system, a recommendation computing device, and an analyzer system in communication with other computing devices in accordance with one example embodiment of the present disclosure.

FIG. 3 is an expanded block diagram of an example embodiment of a server architecture of the payment processing system and the recommendation computing device, and a plurality of other computing devices in accordance with one example embodiment of the present disclosure.

FIG. 4 illustrates an example configuration of a client system shown in FIGS. 2 and 3 in accordance with one example embodiment of the present disclosure.

FIG. 5 illustrates an example configuration of a server system shown in FIGS. 2 and 3 in accordance with one example embodiment of the present disclosure.

FIG. 6 is a block diagram of an example relationship between cardholders, merchants, and life stages that the cardholders fall into based on purchases from the merchants and transaction data processed by the analyzer system in accordance with one example embodiment of the present disclosure.

FIG. 7 is a block diagram of an example relationship between life stages of cardholders and interests associated with the life stages analyzed by the analyzer system in accordance with one example embodiment of the present disclosure.

FIG. 8 is a block diagram of an example relationship between a set of merchants that sell a specific type of goods in a geographic area and a determination of a most highly regarded merchant from the set analyzed by the analyzer system in accordance with one example embodiment of the present disclosure.

FIG. 9 is a block diagram of an example data flow from purchases made by a cardholder to a recommendation of a merchant for the cardholder generated by the analyzer system in accordance with one example embodiment of the present disclosure.

FIG. 10 is a block diagram of example communications among a cardholder, a server system, and the recommendation computing device of FIG. 2 in accordance with one example embodiment of the present disclosure.

FIG. 11 is a flowchart of an example process that may be performed by the analyzer system for recommending a merchant based on transaction data in accordance with one example embodiment of the present disclosure.

FIG. 12 is a diagram of components of one or more example computing devices that may be used in embodiments of the described systems and methods.

DETAILED DESCRIPTION OF THE DISCLOSURE

Figure 1:
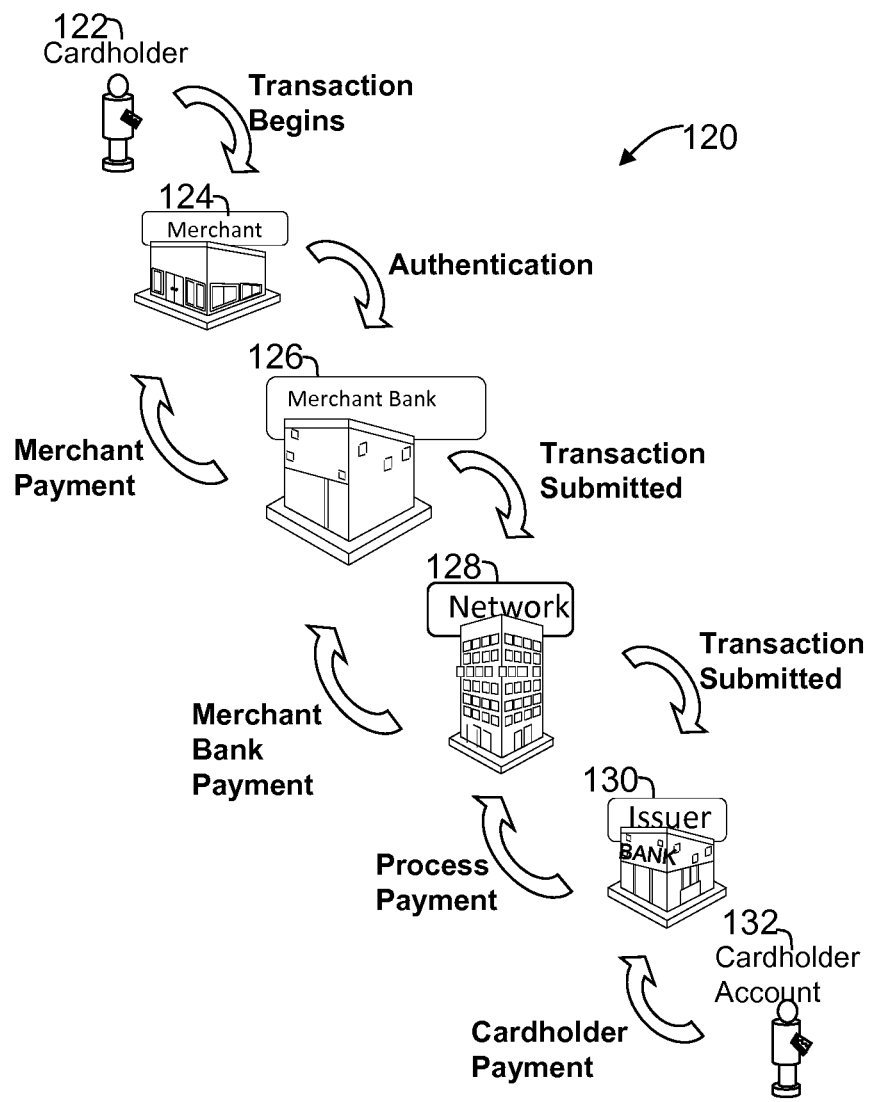
FIGS. 1-12 show example embodiments of the methods and systems described herein.

Implementations of the method and system (the "analyzer system") disclosed herein include a recommendation computing device in communication with a payment network computing device. The analyzer system receives transaction data and determines which, among a plurality of merchants, are the more highly regarded merchants, based on the transaction data. The analyzer system also generates a profile of a cardholder based on stored transaction data associated with the cardholder. The profile indicates a life stage of the cardholder. More specifically, the analyzer system determines a life stage of the cardholder based on purchases made by the cardholder that were processed through the payment network. The analyzer system then recommends the more highly regarded merchants to the cardholder based on the cardholder's life stage. For example, a cardholder who has just had a child may begin purchasing baby products, such as diapers, from one or more merchants that sell baby products. Accordingly, the cardholder's purchases from such merchants appear in the stored transaction data because the cardholder made the purchases using a payment card. The analyzer system detects that the cardholder has entered the life stage of being a parent of an infant based on the stored transaction data. The analyzer system also determines that people in such a life stage also visit a pediatrician, purchase books on parenting, and use a daycare.

The analyzer system determines a first transaction volume associated with a merchant that sells such products or services (collectively "goods") and determines a second transaction volume associated with a second merchant that sells such goods. The analyzer system determines that the first transaction volume is greater than the second transaction volume, meaning the first merchant does more business and is therefore more highly regarded than the second merchant. Accordingly, the analyzer system generates a recommendation to purchase the goods from the first merchant.

In some implementations, the analyzer system determines a geographic area associated with the cardholder and recommends a merchant within that geographic area. For example, the analyzer system may determine the geographic area of the cardholder based on where a majority of purchases made by the cardholder occur. In some implementations, the analyzer system receives an indication from the cardholder that the cardholder agrees to have the profile generated based on the transaction data. In some implementations, merchants pay a fee to be compared to other merchants and potentially be recommended to the cardholder. Accordingly, in such implementations, the system determines whether a particular merchant has paid such a fee prior to transmitting the recommendation of the merchant to the cardholder.

The methods and systems described herein may be implemented using computer programming or engineering techniques including computer software, firmware, hardware or any combination or subset thereof, to perform at least one of: (a) generating a profile associated with a cardholder, based at least in part on first transaction data stored in one or more memory devices, wherein the first transaction data is associated with one or more purchases made by the cardholder through a payment network and wherein the profile indicates a stage of life of the cardholder; (b) retrieving, from the one or more memory devices, second transaction data associated with a plurality of sales associated with a first merchant, wherein the transactions were processed through the payment network; (c) determining a transaction volume associated with the first merchant; and (d) generating a recommendation for the cardholder to purchase goods from the first merchant, based at least in part on the determined transaction volume and the profile associated with the cardholder. By performing these steps, the resulting technical effect includes at least using actual payment transaction data to make a recommendation of a merchant to a consumer. Accordingly, the recommendations made to the consumers are more relevant because they are based on actual purchases of the consumer, rather than professed interests of the consumer.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

In one embodiment, a computer program is provided, and the program is embodied on a computer-readable medium. In an example embodiment, the analyzer system is executed on a single computer system, without requiring a connection to a server computer. In a further example embodiment, the analyzer system is being run in a Windows® environment (Windows is a registered trademark of Microsoft Corporation, Redmond, Wash.). In yet another embodiment, the analyzer system is run on a mainframe environment and a UNIX® server environment (UNIX is a registered trademark of AT&T located in New York, N.Y.). The application is flexible and designed to run in various different environments without compromising any major functionality. In some embodiments, the analyzer system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment card system 120 for enabling ordinary payment-by-card transactions in which merchants and card issuers do not necessarily have a one-to-one relationship. The present disclosure relates to payment card system 120, such as a credit card payment system using the MasterCard® payment card system payment network 128 (also referred to as an "interchange" or "interchange network"). MasterCard® payment card system payment network 128 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 120, a financial institution such as an issuer 130 issues a payment card for an account, such as a credit card account or a debit card account, to a cardholder 122, who uses the payment card to tender payment for a purchase from a merchant 124. To accept payment with the payment card, merchant 124 must normally establish an account with a financial institution that is part of the financial payment system. This financial institution is usually called the "merchant bank" or the "acquiring bank" or "acquirer bank" or simply "acquirer". When a cardholder 122 tenders payment for a purchase with a payment card (also known as a financial transaction card), merchant 124 requests authorization from acquirer 126 for the amount of the purchase. Such a request is referred to herein as an authorization request message. The request may be performed over the telephone, but is usually performed through the use of a point-of-interaction terminal, also referred to herein as a point-of-sale device, which reads the cardholder's account information from the magnetic stripe on the payment card and communicates electronically with the transaction processing computers of acquirer 126. Alternatively, acquirer 126 may authorize a third party to perform transaction processing on its behalf. In this case, the point-of-interaction terminal will be configured to communicate with the third party. Such a third party is usually called a "merchant processor" or an "acquiring processor."

Using payment card system payment network 128, the computers of acquirer 126 or the merchant processor will communicate with the computers of issuer 130, to determine whether the cardholder's account 132 is in good standing and whether the purchase is covered by the cardholder's available credit line or account balance. Based on these determinations, the request for authorization will be declined or accepted. If the request is accepted, an authorization code is issued to merchant 124.

When a request for authorization is accepted, the available credit line or available balance of cardholder's account 132 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 124 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, the cardholder's account 132 is decreased. Normally, a charge is posted immediately to cardholder's account 132. The bankcard association then transmits the approval to the acquiring processor for distribution of goods/services, or information or cash in the case of an ATM.

After a transaction is captured, the transaction is settled between merchant 124, acquirer 126, and issuer 130. Settlement refers to the transfer of financial data or funds between the merchant's account, acquirer 126, and issuer 130 related to the transaction. Usually, transactions are captured and accumulated into a "batch," which is settled as a group.

Figure 2:
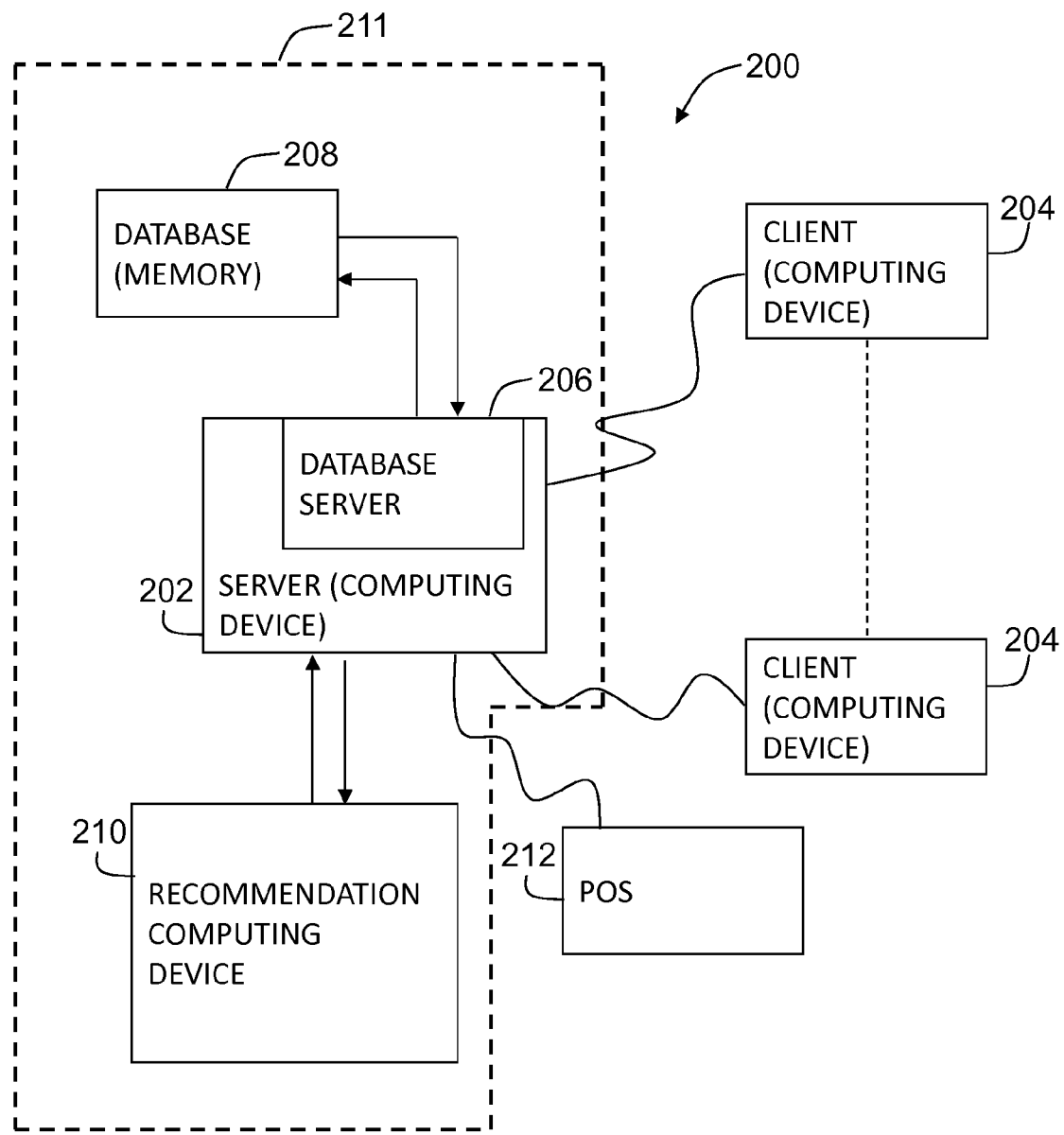

FIG. 2 is a simplified block diagram of a payment processing system 200 and a recommendation computing device 210 and other computing devices in accordance with one embodiment of the present disclosure. In the example embodiment, system 200 includes a server system 202 and a plurality of client subsystems, also referred to as client systems 204 or client computing devices, connected to server system 202. In one embodiment, client systems 204 are computers including a web browser, such that server system 202 is accessible to client systems 204 using the Internet. Client systems 204 are interconnected to the Internet through many interfaces including a network, such as a local area network (LAN) and/or a wide area network (WAN), dial-in connections, cable modems, wireless-connections, and special high-speed ISDN lines. Client systems 204 may be any device capable of interconnecting to the Internet including a web-based phone, personal digital assistant (PDA), or other web-connectable equipment. A database server 206 is connected to a database 208 containing information on a variety of matters, as described below in greater detail. In one embodiment, database 208 is stored on server system 202 and may be accessed by potential users at one of client systems 204 by logging onto server system 202 through one of client systems 204. In any alternative embodiment, database 208 is stored remotely from server system 202 and may be non-centralized. Server system 202 could be any type of computing device configured to perform the steps described herein. Payment system 200 includes at least one point-of-sale device 212 in communication with server system 202. Additionally, recommendation computing device 210 is in communication with server system 202. In some implementations, recommendation computing device 210 is incorporated into or integrated within server system 202. Together, server system 202, database server 206, database 208, and recommendation computing device 210 are included in an analyzer system ("analyzer computing device") 211.

As discussed below, payment processing system 200 processes payments from transactions between cardholders and merchants. For example, one or more such transactions may be initiated at point-of-sale device 212. In processing such payments, server system 202 accesses and populates card transaction data ("transaction data"), stored in database 208. The transaction data includes, for example, merchant identifiers, merchant locations, transaction amounts, product identifiers (e.g., stock keeping units (SKUs)), cardholder identifiers, and transaction dates. Server system 202 analyzes such transaction data and generates a profile associated with at least one cardholder, such as cardholder 122. The profile includes an indication of the life stage of cardholder 122. Additionally, server system 202 determines a most highly regarded merchant of a plurality of merchants selling a specific class of goods that cardholder 122 may be interested in, based on the life stage of cardholder 122. Server system 202 determines which merchant is the most highly regarded merchant based on the stored transaction data. More specifically, in at least some implementations, server system 202 determines a transaction volume (i.e., amount of transactions within a predefined time period) for each merchant and determines that the merchant with the largest transaction volume is the most highly regarded merchant. Subsequently, server system 202 generates a recommendation for cardholder 122 to use the most highly regarded merchant. In at least some implementations, server system 202 transmits the recommendation to recommendation computing device 210, which transmits the recommendation to cardholder 122. In other implementations, recommendation computing device 210 is included within server system 202. In such implementations, server system 202 transmits the recommendation to cardholder 122. As described above, server system 202, database server 206, database 208, and recommendation computing device 210 are included in analyzer system ("analyzer computing device") 211.

Figure 3:
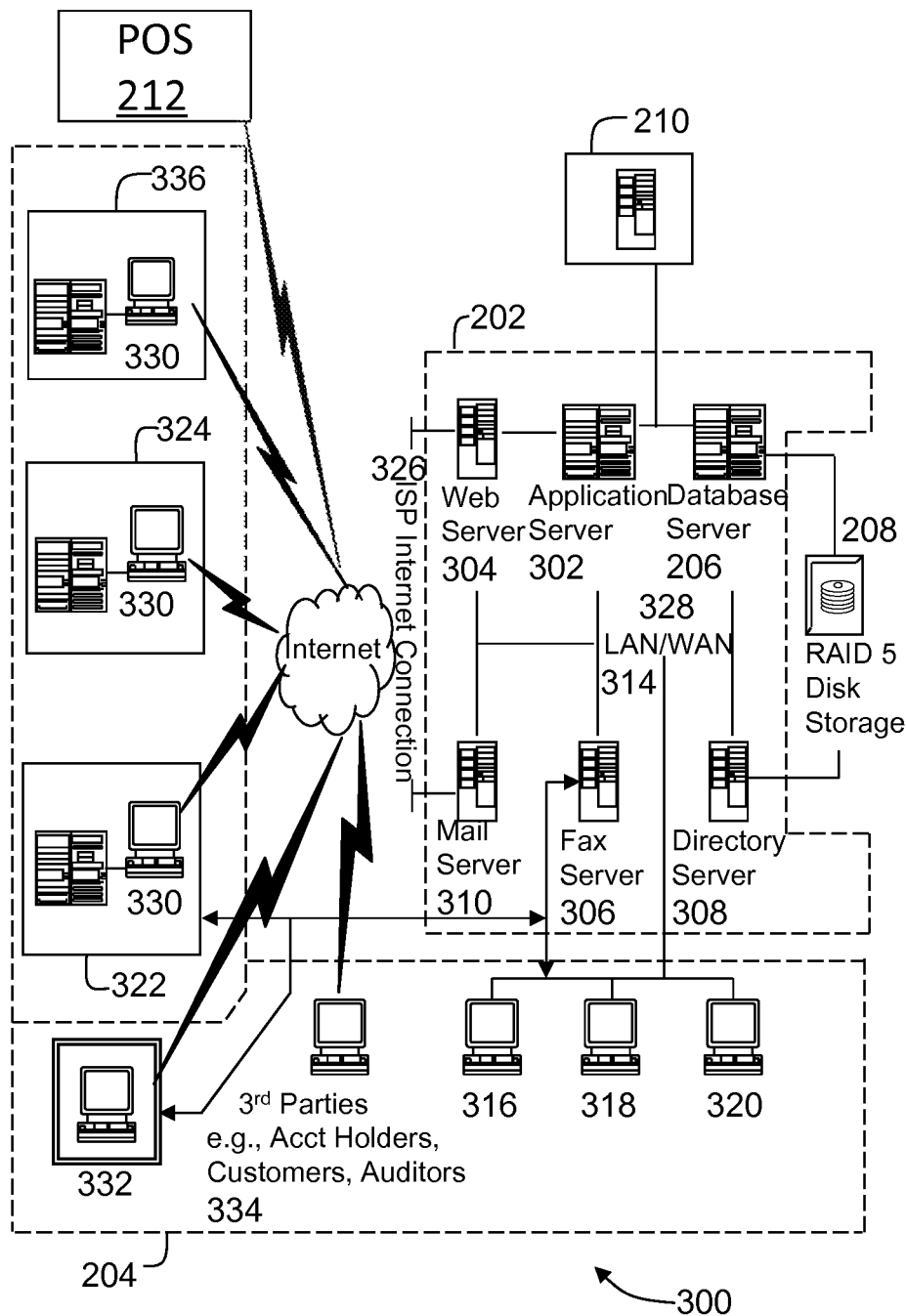

FIG. 3 is an expanded block diagram of an example embodiment of a server architecture of payment processing system 200 in accordance with one embodiment of the present disclosure. Payment processing system 200 includes server system 202, client systems 204, recommendation computing device 210, and point-of-sale device 212. Server system 202 includes database server 206, an application server 302, a web server 304, a fax server 306, a directory server 308, and a mail server 310. Database 208 (e.g., a disk storage unit), is coupled to database server 206 and directory server 308. Servers 206, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet.

Each workstation, 316, 318, and 320, is a personal computer having a web browser. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

Server system 202 is configured to be communicatively coupled to various entities, including acquirers 322 and issuers 324, and to third parties, e.g., auditors, 334 using an Internet connection 326. Server system 202 is also communicatively coupled with at least one merchant 336. Server system 202 is also communicatively coupled to at least one point-of-sale device 212 and to recommendation computing device 210. In some embodiments, recommendation computing device 210 is integrated within server system 202. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328.

In the example embodiment, any authorized individual or entity having a workstation 330 may access system 200. At least one of the client systems includes a manager workstation 332 located at a remote location. Workstations 330 and 332 include personal computers having a web browser. Also, workstations 330 and 332 are configured to communicate with server system 202. Furthermore, fax server 306 communicates with remotely located client systems, including a client system 332, using a telephone link. Fax server 306 is configured to communicate with other client systems 316, 318, and 320 as well.

Figure 4:
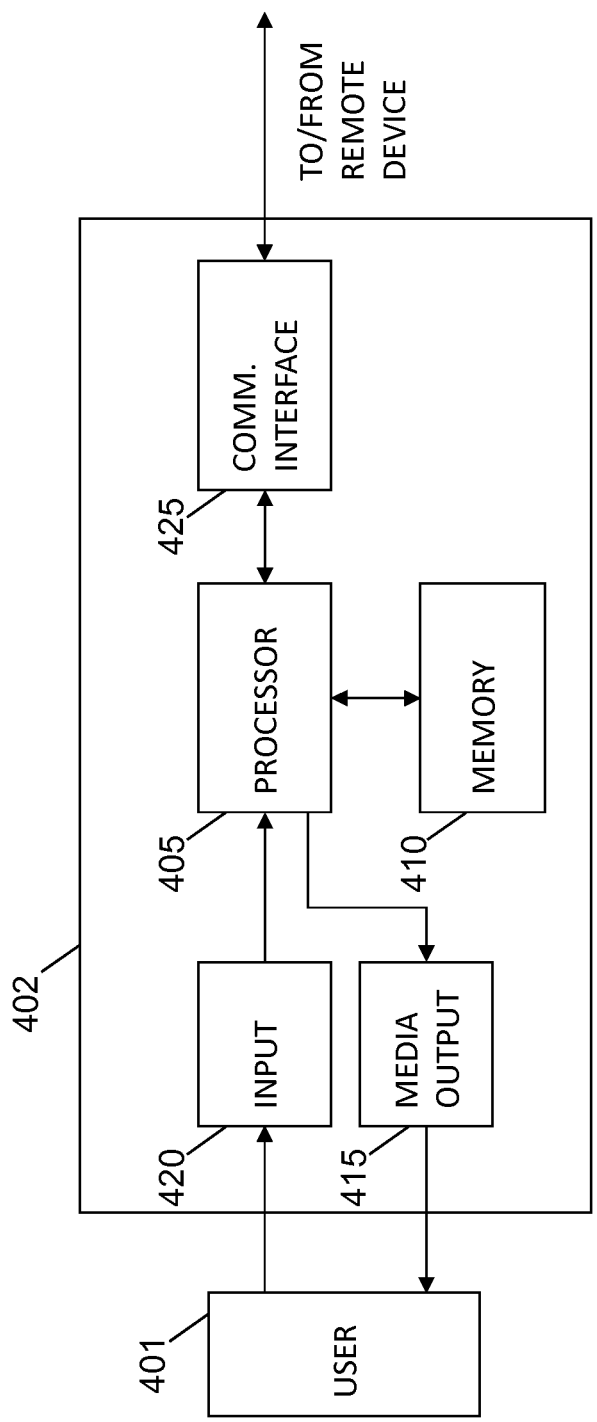

FIG. 4 illustrates an example configuration of a cardholder computing device 402 operated by a user 401. User 401 may include cardholder 122 (FIG. 1). Cardholder computing device 402 may include, but is not limited to, client systems ("client computing devices") 204, 316, 318, and 320, workstation 330, and manager workstation 332 (shown in FIG. 3). The configuration of cardholder computing device 402 is also representative of point-of-sale device 212.

Cardholder computing device 402 includes one or more processors 405 for executing instructions. In some embodiments, executable instructions are stored in a memory area 410. Processor 405 may include one or more processing units (e.g., in a multi-core configuration). One or more memory devices 410 are any one or more devices allowing information such as executable instructions and/or other data to be stored and retrieved. One or more memory devices 410 may include one or more computer-readable media.

Cardholder computing device 402 also includes at least one media output component 415 for presenting information to user 401. Media output component 415 is any component capable of conveying information to user 401. In some embodiments, media output component 415 includes an output adapter such as a video adapter and/or an audio adapter. An output adapter is operatively coupled to processor 405 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, cardholder computing device 402 includes an input device 420 for receiving input from user 401. Input device 420 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 415 and input device 420.

Cardholder computing device 402 may also include a communication interface 425, which is communicatively couplable to a remote device such as server system 202 or a web server operated by a merchant. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in one or more memory devices 410 are, for example, computer-readable instructions for providing a user interface to user 401 via media output component 415 and, optionally, receiving and processing input from input device 420. A user interface may include, among other possibilities, a web browser and client application. Web browsers enable users, such as user 401, to display and interact with media and other information typically embedded on a web page or a website from server system 202 or a web server associated with a merchant. A client application allows user 401 to interact with a server application from server system 202 or a web server associated with a merchant.

Figure 5:
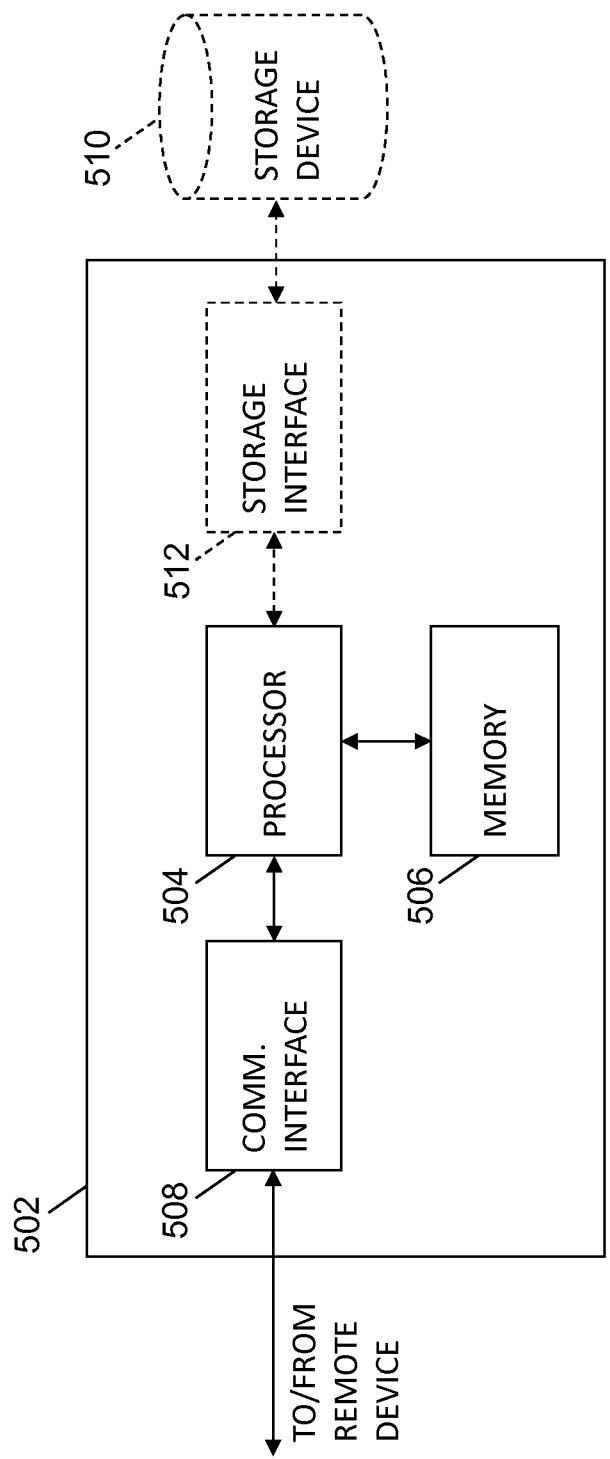

FIG. 5 illustrates an example configuration of a server computing device 502 such as server system 202 (shown in FIGS. 2 and 3). Server computing device 502 may include, but is not limited to, database server 206, application server 302, web server 304, fax server 306, directory server 308, and mail server 310. Server computing device 502 is also representative of recommendation computing device 210 and of analyzer system ("analyzer computing device") 211.

Server computing device 502 includes one or more processors 504 for executing instructions. Instructions may be stored in one or more memory devices 506, for example. One or more processors 504 may include one or more processing units (e.g., in a multi-core configuration).

One or more processors 504 are operatively coupled to a communication interface 508 such that server computing device 502 is capable of communicating with a remote device such as cardholder computing device 402 or another server computing device 502. For example, communication interface 508 may receive requests from client systems 204 via the Internet, as illustrated in FIGS. 2 and 3.

One or more processors 504 may also be operatively coupled to one or more storage devices 510. One or more storage devices 510 are any computer-operated hardware suitable for storing and/or retrieving data. In some embodiments, one or more storage devices 510 are integrated in server computing device 502. For example, server computing device 502 may include one or more hard disk drives as one or more storage devices 510. In other embodiments, one or more storage devices 510 are external to server computing device 502 and may be accessed by a plurality of server computing devices 502. For example, one or more storage devices 510 may include multiple storage units such as hard disks or solid state disks in a redundant array of inexpensive disks (RAID) configuration. One or more storage devices 510 may include a storage area network (SAN) and/or a network attached storage (NAS) system. In some embodiments, one or more storage devices 510 may include database 208.

In some embodiments, one or more processors 504 are operatively coupled to one or more storage devices 510 via a storage interface 512. Storage interface 512 is any component capable of providing one or more processors 504 with access to one or more storage devices 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing one or more processors 504 with access to one or more storage devices 510.

One or more memory devices 410 and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
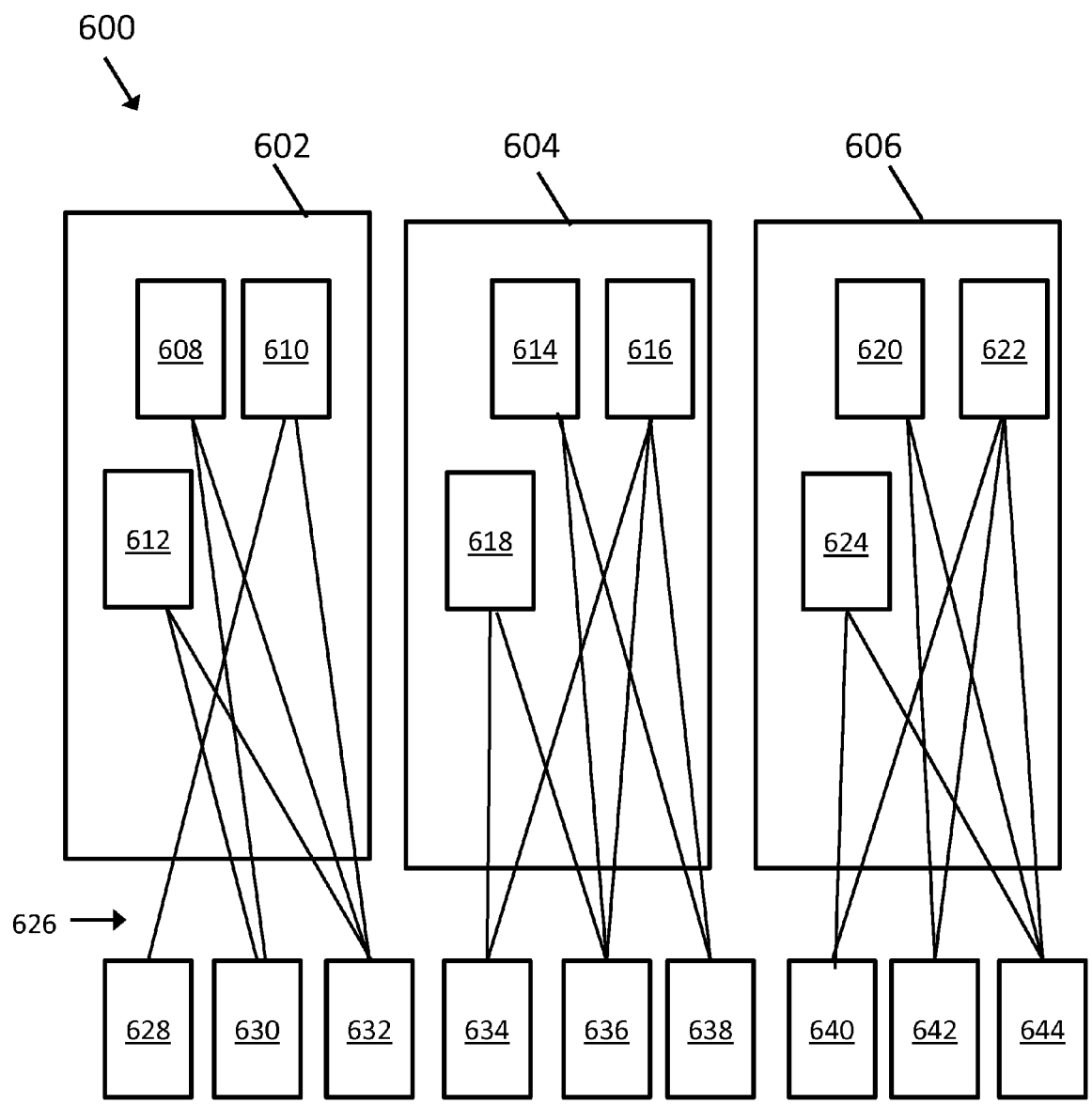

FIG. 6 is a block diagram of an example relationship 600 between cardholders 608, 610, 612, 614, 616, 618, 620, 622, and 624, merchants 628, 630, 632, 634, 636, 638, 640, 642, and 644, and life stages 602, 604, 606 that the cardholders fall into based on purchases 626 from the merchants. Analyzer system 211 analyzes relationship 600. More specifically, database 208 (FIG. 2) includes stored transaction data representing transactions (i.e., purchases of products and/or services, collectively "goods") made by cardholders with merchants. For example, the stored transaction data indicates that first cardholder 608 made one or more purchases from second merchant 630 and third merchant 632. The stored transaction data also indicates that second cardholder 610 made one or more purchases from first merchant 628 and third merchant 632. Additionally, third cardholder 612 made one or more purchases from second merchant 630 and third merchant 632. Server system 202 associates first cardholder 608, second cardholder 610, and third cardholder 612 with a first life stage 602, based at least in part on the fact that cardholders 608, 610, and 612 purchased from a common set of merchants (e.g., first merchant 628, second merchant 630, and third merchant 632). Additionally, server system 202 may base the categorization on specific products or services ("goods") purchased from the merchants, a price paid, or average price paid ("average transaction amount") associated with the purchases, and/or a frequency of purchases associated with each of the cardholders 608, 610, and 612 during a predefined time period, such as one month.

As an example, cardholders 608, 610, and 612 are all in a first life stage 602 of having recently purchased a house. Accordingly, cardholders 608, 610, and 612 purchase home-improvement goods from one or more of merchant A 628, merchant B 630, and merchant C 632. As another example, cardholders 614, 616, and 618 are all in a second life stage 604 of having a newborn baby. Accordingly, cardholders 614, 616, and 618 purchase baby-related goods including diapers and formula from one or more of merchant D 634, merchant E 636, and merchant F 638. As yet another example, cardholders 620, 622, and 624 are in a third life stage 606 of sending a child to college. Accordingly, cardholders 620, 622, and 624 purchase college course books from one or more of merchant G 640, merchant H 642, and merchant I 644. In some implementations, server system 202 determines the life stages 602, 604, and 606 based on comparing the purchases 626 of cardholders 608, 610, 612, 614, 616, 618, 620, 622, and 624 to predefined sets of reference goods associated with respective life stages defined in database 208. In other implementations, server system 202 determines the life stages 602, 604, and 606 by identifying similarities in the purchases 626 of cardholders 608, 610, 612, 614, 616, 618, 620, 622, and 624.

Figure 7:
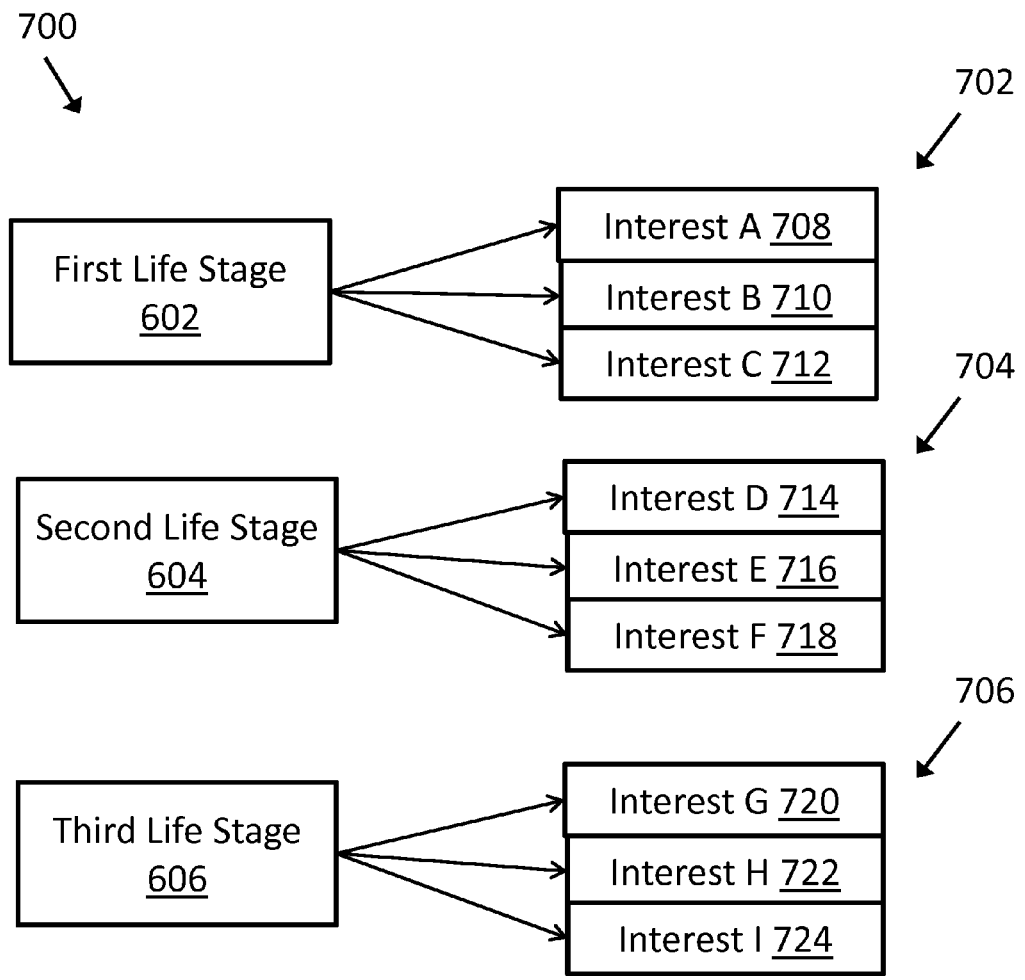

FIG. 7 is a block diagram of an example relationship 700 between life stages 602, 604, and 606 and interests 708, 710, 712, 714, 716, 718, 720, 722, and 724 associated with the life stages 602, 604, and 606. More specifically, first life stage 602 is associated with interest A 708, interest B 710, and interest C 712. For example, interest A 704 is paint, interest B 706 is ladders, and interest C 706 is lawn mowers. Second life stage 604 is associated with interest D 714, interest E 716, and interest F 718, each corresponding to different baby-related goods, as described with reference to FIG. 6. Third life stage 606 is associated with interest G 720, interest H 722, and interest I 724, each associated with college-related goods, as described above. In other words, each interest represents a set of goods sold by merchants, such as merchants 628, 630, 632, 634, 636, 638, 640, 642, 644 and/or other merchants. While a particular cardholder 122 may be in the same life stage as cardholders 608, 610, and 612, cardholder 122 may not be aware of one or more of merchant A 628, merchant B 630, and merchant C 632 or may not know which of merchant A 628, merchant B 630, and merchant C 632 is the most reputable and highly regarded. Accordingly, as described in more detail herein, server system 202 generates a merchant recommendation for use by cardholder 122.

Figure 8:
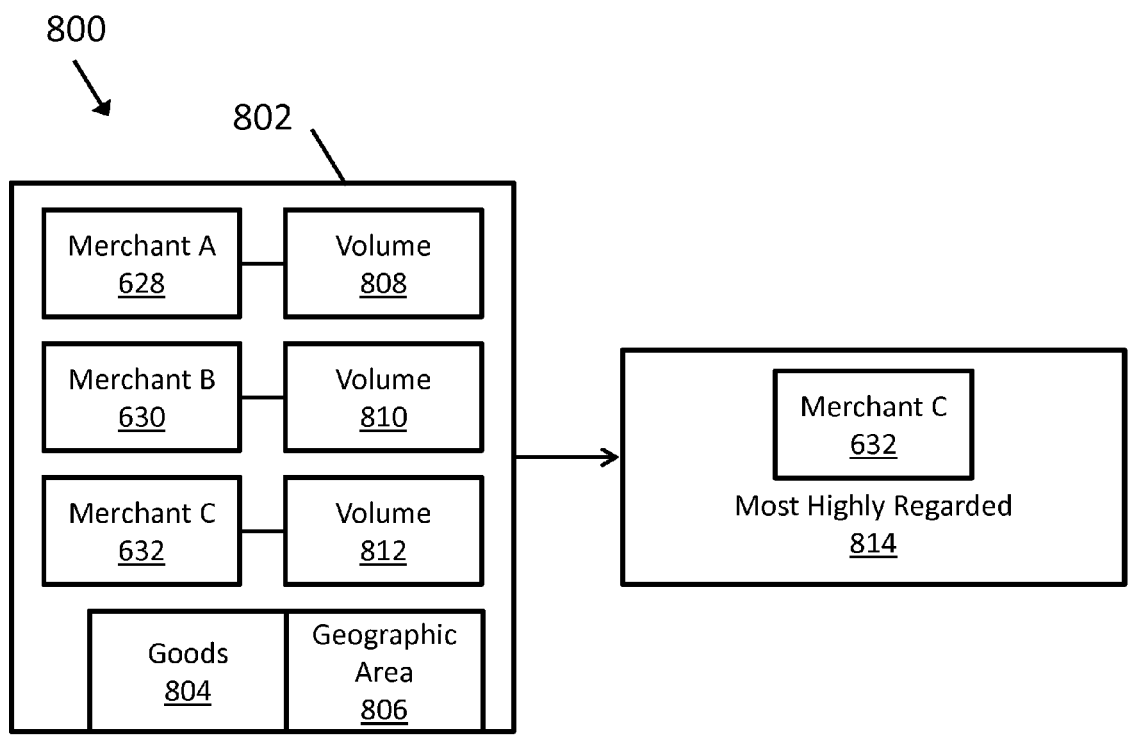

FIG. 8 is a block diagram of an example relationship 800 between a set 802 of merchants 628, 630, and 632 that sell a specific type of goods 804 in a geographic area 806 and a determination 814 of a most highly regarded merchant from the set 802. Set 802 includes merchant A 628, merchant B 630, and merchant C 632. As described above, merchants 628, 630, and 632 sell goods 804 pertaining to home improvement. Database 208 includes location data (e.g., addresses) of merchants 628, 630, and 632. Based on the location data, server system 202 determines that merchants 628, 630, and 632 are within geographic area 806, which may be, for example, a zip code or radius of a predetermined location. Server system 202 groups merchants 628, 630, and 632 based on their commonality in goods 804 and geographic area 806 and compares them, based at least in part, on their corresponding transaction volumes 808, 810, and 812. More specifically, server system 202 compares transaction volume 808 associated with merchant A 628, transaction volume 810 associated with merchant B 630, and transaction volume 812 associated with merchant C 632 and determines which transaction volume 808, 810, 812 is the greatest. Based on the comparison, server system 202 makes a determination 814 that merchant C 632 is the most highly regarded merchant from set 802, at least in part because merchant C 632 has a greater transaction volume than merchant A 628 and merchant B 630.

Figure 9:
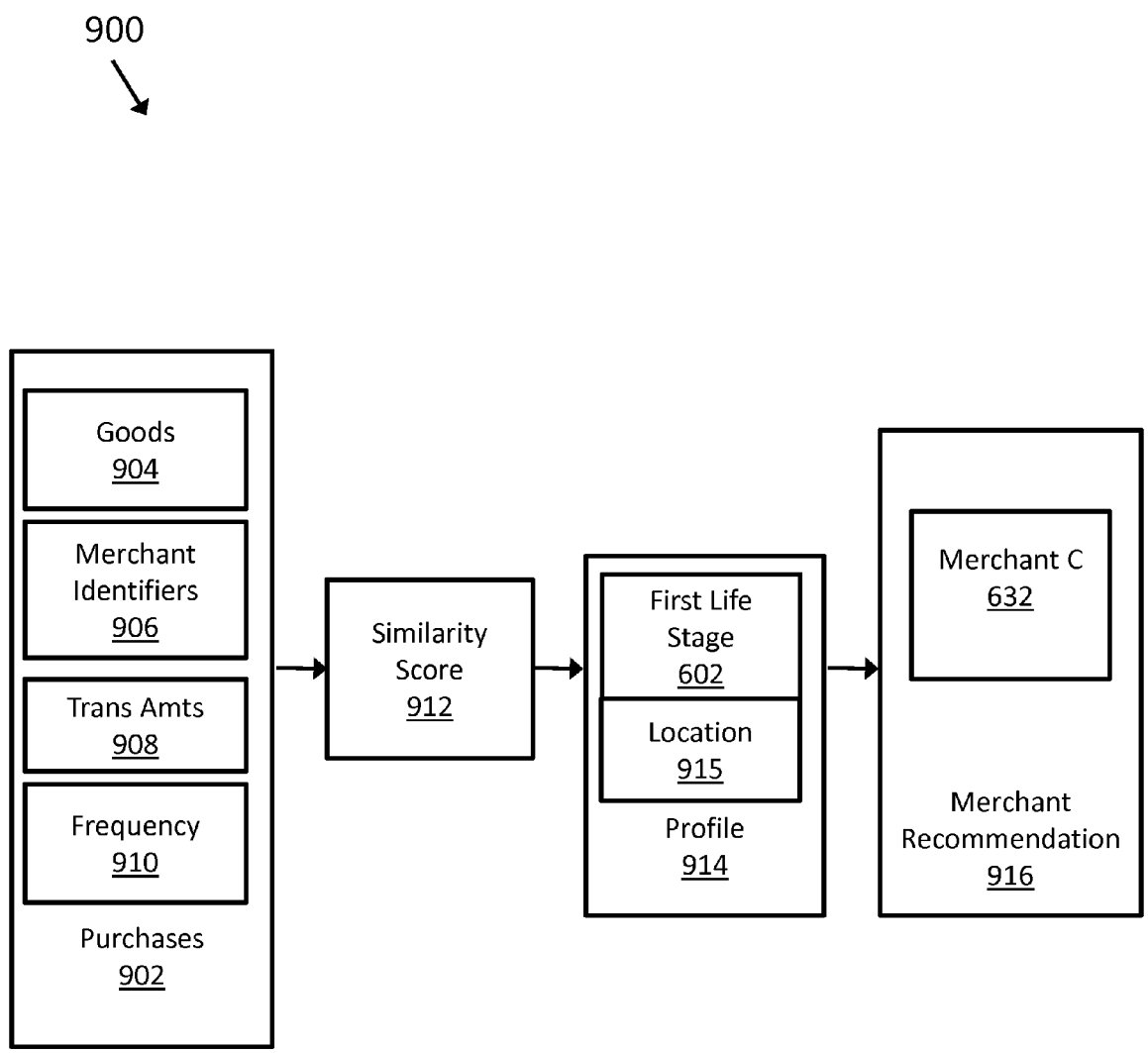

FIG. 9 is a block diagram of an example data flow 900 from purchases 802 made by a cardholder 122 to a recommendation 916 of a merchant for cardholder 122 generated by analyzer system 211. More specifically, purchases 802 are included in the stored transaction data in database 208. Included within the information associated with purchases 802 are identifications of goods 904, merchant identifiers 906, transaction amounts 908, and/or frequencies of purchases 910. Server system 202 compares such information associated with purchases 902 of cardholder 122 with purchases 626 of one or more other cardholders (e.g., cardholders 608, 610, 612, 614, 616, 618, 620, 622, and/or 624) and determines a similarity score 912 based on purchases of such cardholders. For example, in some implementations, server system 202 determines a similarity score for each comparison of purchases 902 of cardholder 122 to purchases of each cardholder 608, 610, 612, 614, 616, 618, 620, 622, and/or 624. The similarity score may be, for example, a percentage or other numeric value. In the example, server system 202 determines that greater similarity scores are generated when comparing purchases of cardholder 122 to purchases made by cardholders in first life stage 602 than when comparing to purchases made by cardholders in second life stage 604 or third life stage 606. Accordingly, server system 202 generates profile 914 for cardholder 122 indicating first life stage 602. In other implementations, rather than comparing purchases 802 to purchases 626 to determine the life stage of cardholder 122, server system 122 compares purchases 802 to one or more reference sets of goods associated with respective life stages stored in database 208. Additionally, server system 202 stores a location 915 associated with cardholder 122. For example, based on purchases 902, server system 202 determines that cardholder 122 made a majority of the purchases from merchants within a certain geographic area, such as geographic area 806. Accordingly, location 915 includes, for example, a zip code associated with geographic area 806. Server system 202 determines that location 915 and life stage 602 stored in profile 914 correspond to goods 804 and geographic area 806 in set 802 (FIG. 8). Based at least in part on that determination, server system 202 generates a recommendation 916 for use by cardholder 122. Recommendation 916 identifies merchant C 632 as a merchant that cardholder 122 should purchase goods from 804.

Figure 10:
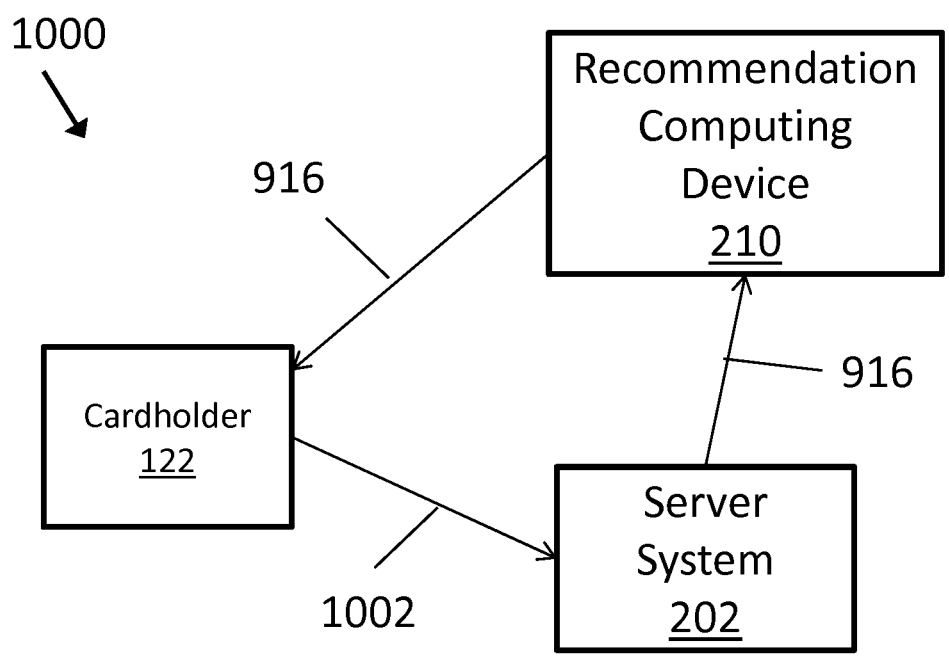

FIG. 10 is a block diagram of example communications 1000 among cardholder 122, server system 202, and recommendation computing device 210. More specifically, prior to server system 202 generating profile 914, cardholder 122 transmits an indication of agreement 1002 for server system 202 to generate profile 916. In some implementations, cardholder 122 transmits the indication of agreement 1002 using a client computing device 204. For example, cardholder 122 may transmit the indication of agreement 1002 through a webpage (not shown) hosted, for example, by server system 202 and displayed on client computing device 204. Server system 202 transmits recommendation 916 to recommendation computing device 210. As described above, in some implementations, recommendation computing device 210 is integrated or included within server system 202. In other implementations, recommendation computing device 210 may be associated with a third party other than a party operating server system 202. Based at least in part on recommendation 916, suggestion computing device 210 transmits recommendation 916 to cardholder 122. For example, recommendation computing device 210 may include recommendation 916 in an electronic message, such as an email, instant message, or text message, or in a webpage displayed to cardholder 122 on client computing device 204. In other implementations, server computing device 202 transmits recommendation 916 to cardholder 122 directly.

Figure 11:
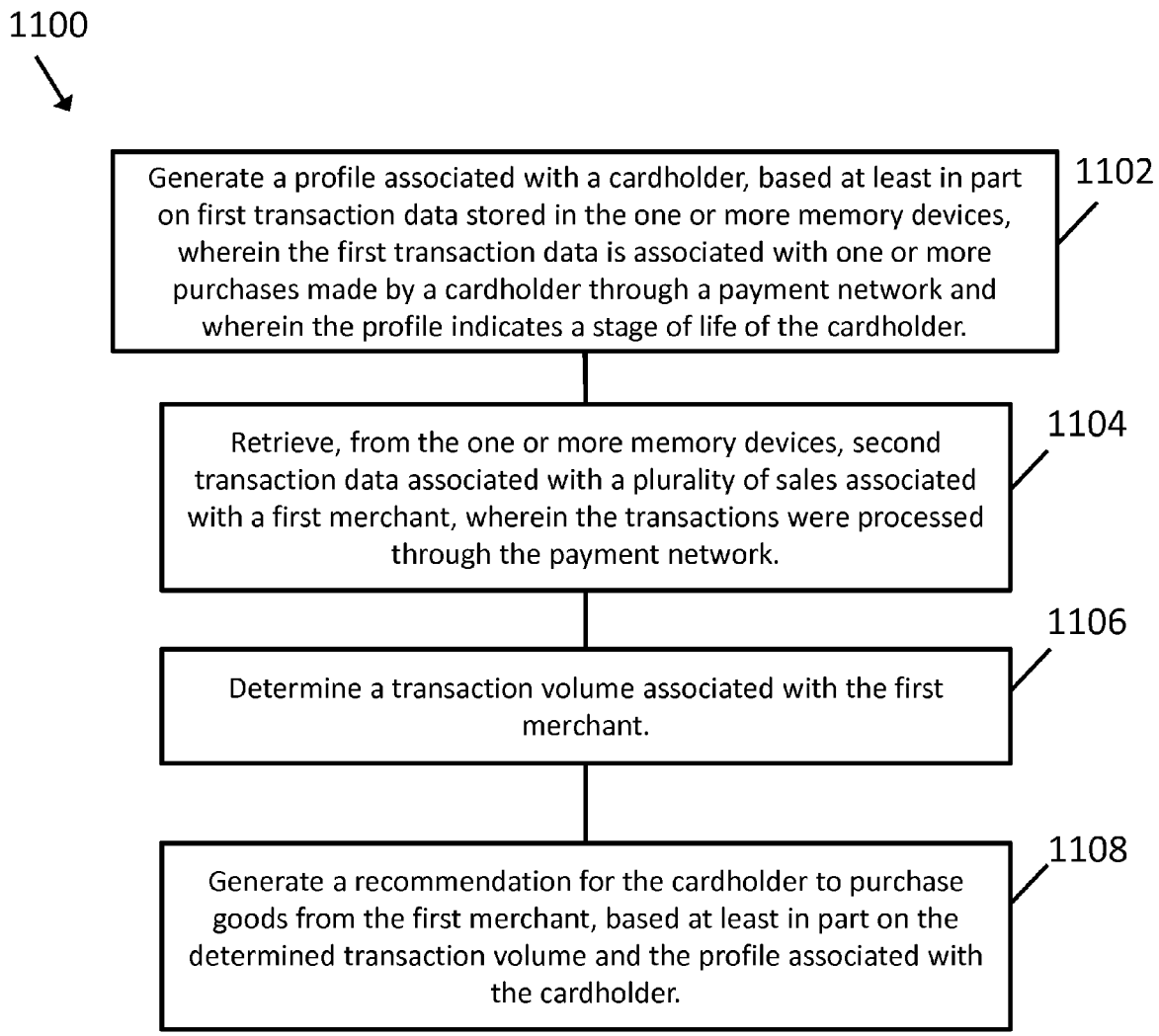
Figure 12:
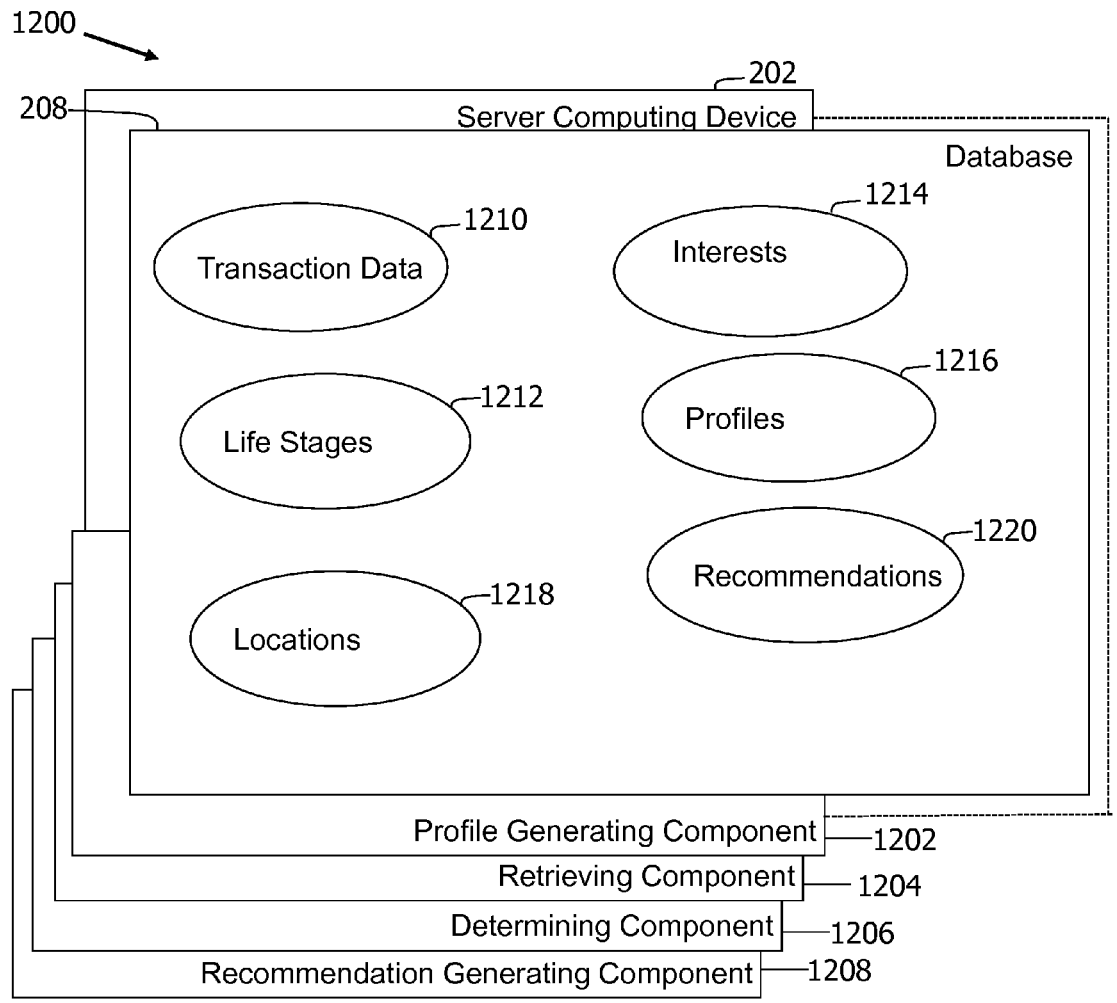

FIG. 11 is a flowchart of an example process 1100 that may be performed by analyzer system 211, for example by server system 202 included within analyzer system 211, for recommending a merchant based on transaction data 1210 (FIG. 12). Initially, server system ("server computing device") 202 generates 1102 profile 914 associated with cardholder 122, based at least in part on first transaction data 1210 stored in the one or more memory devices (e.g., database 208). First transaction data 1210 is associated with one or more purchases 902 made by cardholder 122 through payment network 128. Profile 914 indicates a stage of life 602 of cardholder 122. Additionally, server computing device 202 retrieves 1104, from the one or more memory devices (e.g., database 208), second transaction data 1210 associated with a plurality of sales 626 associated with a first merchant (e.g., merchant C 632), wherein the transactions 626 were processed through payment network 128. Additionally, server computing device 202 determines 1106 a transaction volume 812 associated with the first merchant (e.g., merchant C 632). Additionally, server computing device 202 generates 1108 a recommendation 916 for cardholder 122 to purchase goods from the first merchant (e.g., merchant C 632), based at least in part on the determined transaction volume 812 and profile 914 associated with cardholder 122.

In some implementations, transaction volume 812 is a first transaction volume and server computing device 202 determines a second transaction volume (e.g., transaction volume 810) associated with a second merchant (e.g., merchant B 630). Further, server computing device 202 compares first transaction volume 812 to second transaction volume 810 and determines that first transaction volume 812 is greater than second transaction volume 810. In some implementations, server computing device 202 associates the first merchant (e.g., merchant C 632) with a first geographic area (e.g., geographic area 806), determines a second transaction volume (e.g., transaction volume 810) associated with a second merchant (e.g., merchant B 630) in the first geographic area 806, compares the first transaction volume 812 to the second transaction volume 810, and determines that the first transaction volume 812 is greater than the second transaction volume 810.

In some implementations, server computing device 202 associates the first merchant (e.g., merchant C 632) with a first set of goods (e.g., goods 804), determines a second transaction volume (e.g., transaction volume 810) associated with a second merchant (e.g., merchant B 630) associated with the first set of goods 804, compares the first transaction volume 812 to the second transaction volume 810, and determines that the first transaction volume 812 is greater than the second transaction volume 810. In some implementations, server computing device 202 determines a first geographic area associated with the cardholder (e.g., location 915 in geographic area 806), determines that the first merchant (e.g., merchant C 632) is within the first geographic area 806, determines a first category of goods 804 associated with cardholder 122, based on profile 914, and determines that the first merchant (e.g., merchant C 632) sells goods 804 associated with cardholder 122. That is, merchant C 632 sells goods 804 associated with the life stage 602 of cardholder 122. In some implementations, server computing device 202 receives, from cardholder 122, an indication 1002 that cardholder 122 agrees to generation of profile 914. In some implementations, server computing device 202 transmits the recommendation 916 to a client computing device 204 associated with cardholder 122. In some implementations, server computing device 202 determines that the first merchant (e.g., merchant C 632) has paid a recommendation fee prior to transmission of the recommendation 916 to the client computing device 204 associated with cardholder 122.

In some implementations, server computing device 202 determines whether certain goods 804 are geographically-based. More specifically, a good 804 is geographically-based if the geographic proximity of the merchant (e.g., merchant A 628) to cardholder 122 affects the provisioning of the good 804 to the cardholder 122. As an example, server computing device 202 determines whether a merchant (e.g., merchant A 628) should be physically in the same geographic area 806 as cardholder 122 in order to provide goods 804 to cardholder 122. For example, if the good 804 is a plumbing service or a pizza delivery service, then the merchant (e.g., merchant A 628) should be in the geographic area 806 of cardholder 122 and the goods 804 are geographically-based. In contrast, a digital book is a non-geographically-based good 804 because the merchant's ability to provide the digital book to the cardholder 122 is not affected by the geographic proximity of the merchant to the cardholder 122. In some implementations, server computing device 202 ranks one or more merchants (e.g., merchant A 628, merchant B 630, and merchant C 632) based additionally on the determination of whether the goods 804 are geographically-based. For example, if merchant B 630 would be ranked higher than merchant A 628 but for the fact that merchant B 630 is geographically closer (e.g., within geographic area 806) of cardholder 122, server computing device 202 ranks merchant B 630 higher than merchant A 628 for goods 804 that are not geographically-based.

FIG. 12 is a diagram 1200 of components of one or more example computing devices of analyzer system 211 ("analyzer computing device"), for example, server computing device 202, that may be used in embodiments of the described systems and methods. FIG. 12 further shows a configuration of database 208 (FIG. 2). Database 208 is communicatively coupled to server computing device 202.

Server computing device 202 includes a profile generating component 1202 for generating a profile 914 associated with a cardholder (e.g., cardholder 122), based at least in part on first transaction data 1210 stored in the one or more memory devices (e.g., database 208). The first transaction data 1210 is associated with one or more purchases 902 made by cardholder 122 through payment network 128. Profile 914 indicates a stage of life 602 of cardholder 122. Server computing device 202 additionally includes a retrieving component 1204 for retrieving, from the one or more memory devices (e.g., database 208), second transaction data 1210 associated with a plurality of sales 626 associated with a first merchant (e.g., merchant C 632), wherein the transactions were processed through the payment network 128. Additionally, server computing device 202 includes a determining component 1206 for determining a transaction volume (e.g., transaction volume 812) associated with the first merchant (e.g., merchant C 632). Additionally, server computing device 202 includes a recommendation generating component 1208 for generating a recommendation 916 for cardholder 122 to purchase goods 804 from the first merchant (e.g., merchant C 632), based at least in part on the determined transaction volume 812 and the profile 914 associated with cardholder 122.

In an example embodiment, database 208 is divided into a plurality of sections, including but not limited to, a transaction data section 1210, a life stages section 1212, an interests section 1214, a profiles section 1216, a locations section 1218, storing locations of merchants and cardholders, and a recommendations section 1220. These sections within database 208 are interconnected to retrieve and store information in accordance with the functions and processes described above.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405, 504, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

The embodiments of the method and system described above generate a recommendation for a cardholder to use a particular merchant based on a life stage of the cardholder and a determination of how highly regarded the merchant is among other merchants that sell similar goods. The system generates such a recommendation without requiring anyone to rate the merchants or to expressly state what types of goods they are interested in purchasing. Accordingly, the system enables cardholders to receive recommendations of merchants that are relevant to the interests of the cardholders, while requiring less input from the cardholders than is required by known merchant recommendation systems.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for recommending a merchant based on transaction data, said method implemented using an analyzer computing device in communication with one or more memory devices, said method comprising:
defining a plurality of stages of life, wherein each stage of life of the plurality of stages of life is associated with a time period in a lifetime of a cardholder;
receiving first transaction data for the cardholder, wherein the first transaction data is associated with one or more purchases made by the cardholder through a payment network;
determining a stage of life of the cardholder based on determining an interest of the cardholder, wherein the interest represents goods purchased by the cardholder including the one or more purchases;
generating, by the analyzer computing device, a profile associated with the cardholder, based at least in part on associating the first transaction data with the stage of life for the cardholder, wherein the profile indicates the stage of life of the cardholder;
retrieving, by the analyzer computing device, from the one or more memory devices, second transaction data associated with a plurality of sales associated with a first merchant, wherein the transactions were processed through the payment network;
determining, by the analyzer computing device, a transaction volume associated with the first merchant;
generating a ranking placing the first merchant higher than at least one other merchant in a plurality of merchants, based on a determination that the transaction volume is higher than at least one other transaction volume associated with a plurality of merchants, indicating that the first merchant is more highly regarded than the plurality of merchants; and
generating, by the analyzer computing device, a recommendation for the cardholder to purchase goods from the first merchant, based at least in part on the ranking and a determination that the first merchant sells one or more goods corresponding to the interest associated with the stage of life of the cardholder.

2. The method of claim 1, wherein the transaction volume is a first transaction volume, said method further comprising:
determining a second transaction volume associated with a second merchant;
comparing the first transaction volume to the second transaction volume; and
determining that the first transaction volume is greater than the second transaction volume.

3. The method of claim 1, further comprising:
associating the first merchant with a first geographic area;
determining a second transaction volume associated with a second merchant in the first geographic area;
comparing the first transaction volume to the second transaction volume; and
determining that the first transaction volume is greater than the second transaction volume.

4. The method of claim 1, further comprising:
associating the first merchant with a first set of goods;
determining a second transaction volume associated with a second merchant associated with the first set of goods;
comparing the first transaction volume to the second transaction volume; and
determining that the first transaction volume is greater than the second transaction volume.

5. The method of claim 1, further comprising:
determining a first geographic area associated with the cardholder;
determining that the first merchant is within the first geographic area;
determining a first category of goods associated with the cardholder, based on the profile; and
determining that the first merchant sells goods associated with the cardholder.

6. The method of claim 5, further comprising determining that the goods from the first merchant are geographically-based, further comprising determining that the geographic proximity of the first merchant to the cardholder affects the provisioning of the goods to the cardholder.

7. The method of claim 1, further comprising:
determining that the first merchant has paid a recommendation fee; and
transmitting the recommendation to a client computing device associated with the cardholder.

8. The method of claim 1, wherein the stage of life is associated with one or more interests, and wherein the one or more interests each represent the one or more goods sold by the plurality of merchants, further comprising determining the stage of life for the cardholder by:

comparing the first transaction data of the cardholder to transaction data associated with at least one other cardholder; and generating a similarity score for the first cardholder wherein the similarity score indicates that the first cardholder is experiencing a stage of life.

9. The method of claim 8, wherein determining the stage of life for the cardholder includes comparing the first transaction data of the cardholder with one or more predefined sets of reference goods.

10. An analyzer computing device for recommending a merchant based on transaction data, said computing device comprising one or more processors in communication with one or more memory devices, said analyzer computing device configured to:

define a plurality of stages of life, wherein each stage of life of the plurality of stages of life is associated with a time period in a lifetime of a cardholder;

receive first transaction data for the cardholder, wherein the first transaction data is associated with one or more purchases made by the cardholder through a payment network;

determine a stage of life of the cardholder based on first transaction data of the cardholder, wherein said analyzer computing device is further configured to determine an interest of the cardholder, and wherein the interest represents goods purchased by the cardholder including the one or more purchases;

generate a profile associated with the cardholder, based at least in part on associating the first transaction data with the stage of life for the cardholder, wherein the profile indicates the stage of life of the cardholder;

retrieve, from the one or more memory devices, second transaction data associated with a plurality of sales associated with a first merchant, wherein the transactions were processed through the payment network;

determine a transaction volume associated with the first merchant;

generate a ranking placing the first merchant higher than at least one other merchant in a plurality of merchants, based on a determination that the transaction volume is higher than at least one other transaction volume associated with a plurality of merchants, indicating that the first merchant is more highly regarded than the plurality of merchants; and generate a recommendation for the cardholder to purchase goods from the first merchant, based at least in part on the ranking and a determination that the first merchant sells one or more goods corresponding to the interest associated with the stage of life of the cardholder.

11. The analyzer computing device of claim 10, wherein the transaction volume is a first transaction volume, said analyzer computing device further configured to:

determine a second transaction volume associated with a second merchant;

compare the first transaction volume to the second transaction volume; and determine that the first transaction volume is greater than the second transaction volume.

12. The analyzer computing device of claim 10, further configured to:

associate the first merchant with a first geographic area;
determine a second transaction volume associated with a second merchant in the first geographic area;
compare the first transaction volume to the second transaction volume; and
determine that the first transaction volume is greater than the second transaction volume.

13. The analyzer computing device of claim 10, further configured to:

associate the first merchant with a first set of goods;
determine a second transaction volume associated with a second merchant associated with the first set of goods;
compare the first transaction volume to the second transaction volume; and
determine that the first transaction volume is greater than the second transaction volume.

14. The analyzer computing device of claim 10, further configured to:

determine a first geographic area associated with the cardholder;
determine that the first merchant is within the first geographic area;
determine a first category of goods associated with the cardholder, based on the profile; and
determine that the first merchant sells goods associated with the cardholder.

15. The analyzer computing device of claim 10, further configured to:

receive, from a client computing device associated with the cardholder, an indication that the cardholder agrees to generation of the profile; and
transmit the recommendation to the client computing device.

16. The analyzer computing device of claim 10, further configured to determine that the first merchant has paid a recommendation fee prior to generating the recommendation to the client computing device associated with the cardholder.

17. A non-transitory computer-readable storage medium having computer-executable instructions embodied thereon, wherein when executed by an analyzer computing device having one or more processors in communication with one or more memory devices, the computer-executable instructions cause the analyzer computing device to:

define a plurality of stages of life, wherein each stage of life of the plurality of stages of life is associated with a time period in a lifetime of a cardholder;

receive first transaction data for the cardholder, wherein the first transaction data is associated with one or more purchases made by the cardholder through a payment network;

determine a stage of life of the cardholder based on first transaction data of the cardholder, wherein said analyzer computing device is further configured to determine an interest of the cardholder, and wherein the interest represents goods purchased by the cardholder including the one or more purchases;

generate a profile associated with the cardholder, based at least in part on associating the first transaction data with the stage of life for the cardholder, wherein the profile indicates the stage of life of the cardholder;

retrieve, from the one or more memory devices, second transaction data associated with a plurality of sales associated with a first merchant, wherein the transactions were processed through the payment network;

determine a transaction volume associated with the first merchant;

generate a ranking placing the first merchant higher than at least one other merchant in a plurality of merchants, based on a determination that the transaction volume is higher than at least one other transaction volume associated with a plurality of merchants, indicating that the first merchant is more highly regarded than the plurality of merchants; and generate a recommendation for the cardholder to purchase goods from the first merchant, based at least in part on the ranking and a determination that the first merchant sells one or more goods corresponding to the interest associated with the stage of life of the cardholder.

18. The non-transitory computer-readable storage medium of claim 17, wherein the transaction volume is a first transaction volume and said computer-executable instructions additionally cause the analyzer computing device to:

determine a second transaction volume associated with a second merchant;

compare the first transaction volume to the second transaction volume; and determine that the first transaction volume is greater than the second transaction volume.

19. The non-transitory computer-readable storage medium of claim 17, wherein the computer-executable instructions additionally cause the analyzer computing device to:

associate the first merchant with a first geographic area;

determine a second transaction volume associated with a second merchant in the first geographic area;

compare the first transaction volume to the second transaction volume; and determine that the first transaction volume is greater than the second transaction volume.

20. The non-transitory computer-readable storage medium of claim 17, wherein the computer-executable instructions additionally cause the analyzer computing device to:

associate the first merchant with a first set of goods;

determine a second transaction volume associated with a second merchant associated with the first set of goods;

compare the first transaction volume to the second transaction volume; and determine that the first transaction volume is greater than the second transaction volume.

\* \* \* \* \*